United States Patent [19]

Swenson, Sr.

[11] Patent Number: 5,699,890
[45] Date of Patent: Dec. 23, 1997

[54] SYSTEM FOR MAINTAINING CLUTCH PEDAL HEIGHT AFTER CLUTCH RESURFACING

[76] Inventor: Roger Swenson, Sr., Rte. 2, Williamsville, Mo. 63935

[21] Appl. No.: 592,717

[22] Filed: Jan. 26, 1996

[51] Int. Cl.⁶ .................................................. F16D 13/58
[52] U.S. Cl. ..................... 192/110 R; 192/111 R; 192/70.25; 29/897.1; 411/546
[58] Field of Search ............... 192/110 R, 111 R, 192/70.25; 29/897.1, 402.04, 402.11; 411/531, 546

[56] References Cited

U.S. PATENT DOCUMENTS

| | | | |
|---|---|---|---|
| 409,790 | 8/1889 | Jerome | 411/546 |
| 1,981,504 | 11/1934 | Goodwin | 192/110 R |
| 2,579,179 | 12/1951 | Edens | 192/111 R |
| 2,630,897 | 3/1953 | Porter | 192/110 R X |
| 3,352,393 | 11/1967 | Thelander | 192/70.3 |
| 4,667,799 | 5/1987 | Kummer | 192/110 R X |

FOREIGN PATENT DOCUMENTS

| | | | |
|---|---|---|---|
| 911681 | 5/1954 | Germany | 411/531 |
| 2226258 | 6/1990 | United Kingdom | 411/531 |

*Primary Examiner*—Andrea L. Pitts
*Attorney, Agent, or Firm*—Jim Zegeer

[57] ABSTRACT

Standard internal combustion engine transmissionm system having an engine crankshaft, clutch, flywheel connecting the engine to a drive gear box, a coupling arbor hub having a planar face and a complementary planar face on the flywheel, and a plurality of bolts securing the flywheel to the arbor hub with the planar faces abuting each other. The flywheel has a clutch surface which can be resurfaced by machining to extend the life of the flywheel. The invention reestablishes substantially the same position of the clutch surface after machining as when the clutch surface was new. It includes one or more planar annular plates having a pair of parallel surfaces spaced apart by the thickness T of the planar annular plate member, the thickness T being substantially the amount of metal removed during the machining of said surface, the annular plate member having a plurality of bolt holes, one for each of the bolts to pass therethrough, respectively.

5 Claims, 3 Drawing Sheets

5,699,890

SYSTEM FOR MAINTAINING CLUTCH PEDAL HEIGHT AFTER CLUTCH RESURFACING

BACKGROUND AND BRIEF DESCRIPTION OF THE INVENTION

The present invention is in the field of flywheel resurfacing and relates to the problem of maintaining the clutch surface position after resurfacing and has as its object the avoidance of costly replacement of the flywheel when too much metal is removed from the flywheel or after multiple resurfacing operations on the same flywheel.

Clutch flywheels are frequently resurfaced to remove surface glazing, roughness and other detriments to normal transmission operation. If too much metal is removed the clutch release fork geometry can be changed to significantly interfere with normal operation and affect the clutch pedal position resulting in customer dissatisfaction. The solution in the past has been to replace the flywheel at a cost of several hundred dollars. Other potential spacing problems solved by the invention include excessive metal removed during pump rebuilding, excessive variation in rebuilt torque converter height and main thrust bearing wear.

Instead of replacing the flywheel, the present invention provides a planar shim member which, in its preferred embodiment, is adaptable to a plurality of different standard transmissions. A plurality of break-off centering tabs are formed integral with the shim body. A plurality of bolt holes are formed to accommodate various engine arbor/flywheel bolt positions. In this way, The invention solves the clutch release problem on standard transmissions, eliminates potential master cylinder problems, reestablishes proper clutch release fork geometry, avoids the cost of replacing the flywheel and reestablishes the original surface position of the O.E.M. flywheel so that the clutch pedal returns to the original position.

DESCRIPTION OF THE DRAWINGS

The above and other objects, advantages and features of the invention will become more apparent when considered with the following specification in conjunction with the accompanying drawings wherein.

DETAILED DESCRIPTION OF THE INVENTION

In an internal combustion driven vehicle having a standard transmission, power from the engine is coupled to the wheels by a friction clutch mechanism incorporating a flywheel having a clutch surface which is fictionally engaged by a clutch plate driven to engagement with the clutch surface by a clutch pedal via a linkage and a clutch release fork or yoke. When the clutch requires service, frequently this involves resurfacing the clutch surface and after multiple resurfacing, the geometry is such that the spacing between the flywheel surface and the clutch plate is change affecting the performance and position and extent of pedal movement required to engage the clutch. This leads to numerous customer complaints about the quality of service when the service may have been exemplary. The present invention solves this problem in a expeditious and cost saving manner.

Figure 1:
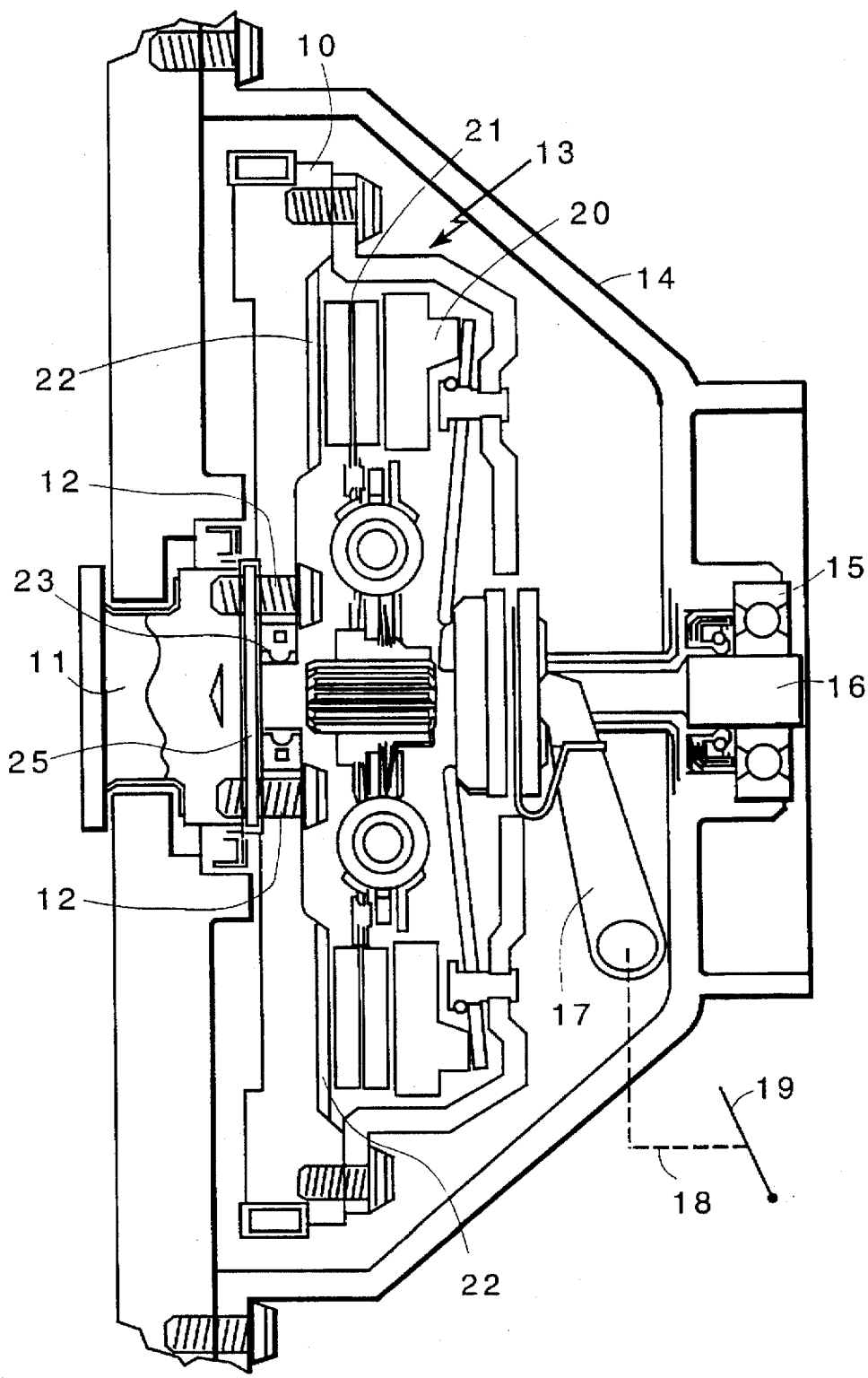
FIG. 1 is a sectional view of a standard transmission assembly incorporating the invention.
Figure 2:
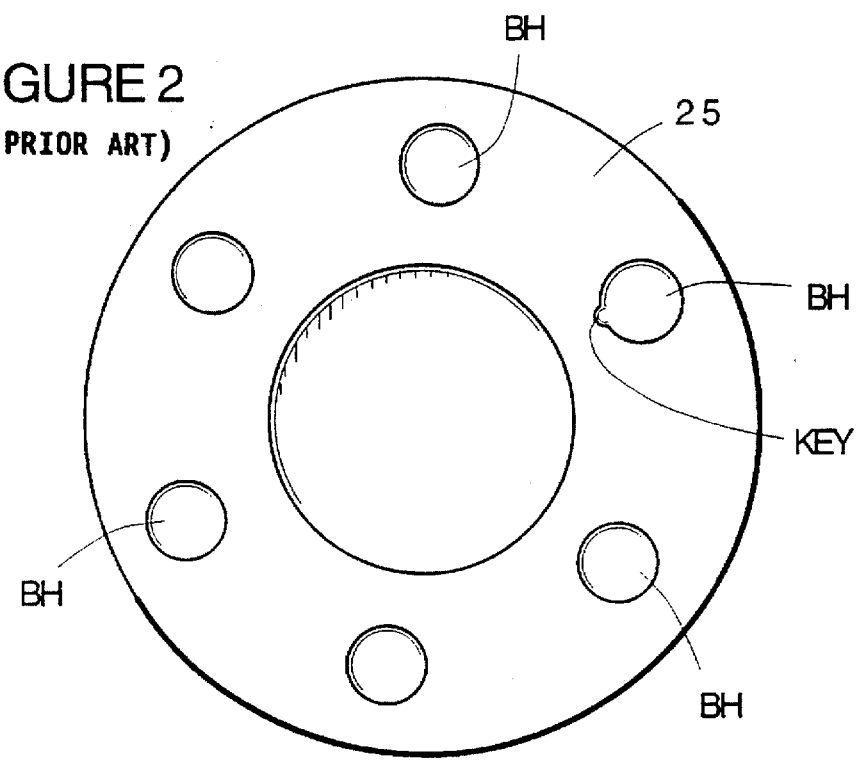
FIG. 2 is a illustration of one embodiment of the invention.

Referring now to FIG. 1, a standard flywheel 10 is secured to the engine (not shown) by an engine crank shaft arbor/hub 11 by bolts 12. The clutch assembly 13 is protected by bell housing 14 which carries bearings 15 for clutch shaft 16 which, in turn, is coupled to a transmission mechanism (not shown). The clutch assembly 13 is slidable along clutch shaft 16 by clutch release fork 17 which is couple by a linkage 18 to clutch pedal 19. Clutch plate 20 carries friction members 21 which engage clutch surface 22 on flywheel 10.

As described earlier, when the clutch requires service, in addition to replacing the friction members 21, the clutch surface 22 frequently has to be machined to restore it and after multiple resurfacing the spacing between the clutch surface 22 and the rest position of the friction members on the clutch plate is such that the clutch pedal must be depressed to a great extent before there is engagement and in the past this has been solved at great expense and dissatisfaction to the customer by replacing the entire flywheel.

The present invention solves this problem by inserting a shim 25 between the engine arbor 11 and flywheel 10, the thickness of shim 25 is a function of the number of resurfacing but is provided in sets of stock sizes such as about 0.025", 0.040", 0.089" etc. Combinations of shim 25 sizes can be used. For example a 0.025" thick shim can be used with a 0.040" shim to provide in effect a 0.065" shim.

Since the bell housing and flywheel have been removed for servicing, the installation of shim 25 does not require more work or installation time in servicing the clutch and results in far fewer customer complaints.

Figure 3:
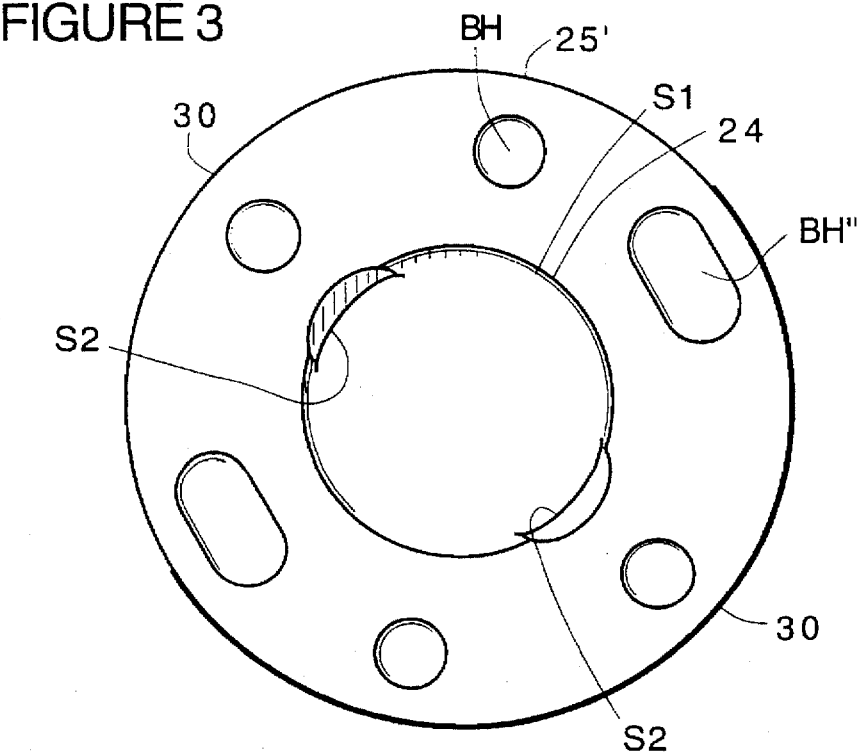
FIG. 3 is an illustration of a second embodiment of the invention.
Figure 4:
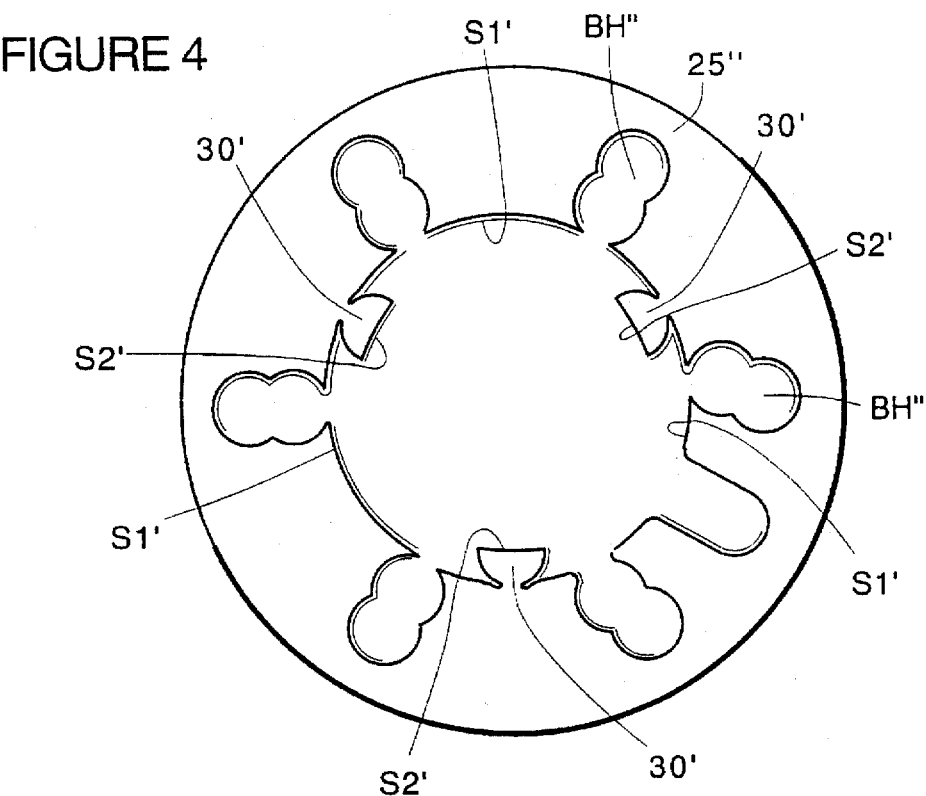
FIG. 4 is an illustration of a third embodiment of the invention.
Figure 5:
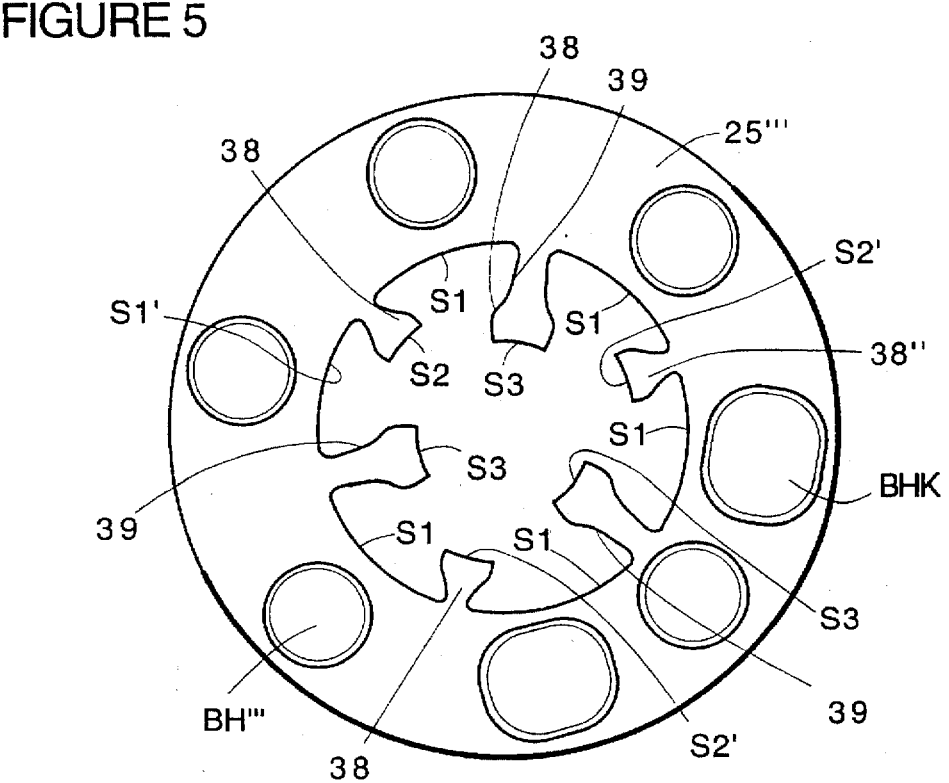
FIG. 5 is an illustration of a further embodiment of the invention.

In order that the shims be adaptable to different diameters of engine arbor-clutch shaft sizes, the preferred embodiment of the shim includes a plurality of break-off tabs 30. As shown in FIG. 3, each break-off tab 30 is joined to the main shim body 26 by break-away sections 31 which may include a score line or a weakened portion 32. It will be noted that each tab has an arcuate outer surface 33 to accommodate the clutch shaft bearings 28. Moreover the break-away sections 32 are recessed below the circular edges 29 so that after the breaking away of tabs 30, the remaining parts of break away sections 32 are at or below circular edge 29. In the embodiments of FIGS. 3 and 4 two different diameters are accommodated. In the embodiment of FIG. 5 there are two sets of break off tabs which enables three diameters of shaft to be accommodated. That is, the outer arcuate surfaces S2 and S3 of tabs 38 and 39 are at different radii. Instead of being spaced circumferemtially the breakaway tabs can be aligned. Bolt holes BH and a KEY notch are spaced to accommodate the bolts 12. In FIGS. 3 and 4 some of the bolt holes BH are elongated and extend into the inner annular space IS.

While the invention has been described and illustrated in respect to its preferred embodiments, it will be appreciated that various other embodiments and adaptations of the invention will occur to those skilled in the art.

What is claimed is:

1. In a internal combustion engine transmission system having an engine crankshaft, clutch, a metal flywheel connecting the engine to a drive gear box, a coupling arbor having a planar face and a complementary planar face on said flywheel, and a plurality of bolts securing said flywheel to said arbor with said planar faces abutting each other, said flywheel having a metal clutch surface which has been resurfaced by machining to remove metal from said clutch surface and extend the life of said flywheel, shim means for establishing substantially the same position of said clutch surface after machining as when the clutch surface was new, said shim means comprising a planar annular plate having a pair of parallel surfaces spaced apart by the thickness (T) of the planar annular plate member, said thickness (T) being substantially the amount of metal removed during the machining of said surface, said annular plate member having a plurality of bolt holes, one for each of said bolts to pass therethrough, respectively, one of said pair of parallel surfaces being adapted to abut said planar face on said arbor and the other of said parallel surfaces being adapted to abut said complementary planar face on said flywheel, the improvement wherein said annular plate has an inner aperture, a plurality of breakaway tabs on said inner aperture which are adapted to be broken away to accommodate larger diameter crankshaft hubs.

2. In an internal combustion engine transmission system having an engine crankshaft, clutch, clutch operating pedal and clutch release fork coupled to said clutch, flywheel connecting the engine to a drive gear box, a coupling arbor having a planar face, a complementary planar face on said flywheel, and a plurality of bolts securing said flywheel to said arbor with said planar faces abutting each other, said flywheel having a metal clutch surface which has been resurfaced by machining to remove a layer of metal, reestablishing substantially the same position of said clutch surface after machining as when the clutch surface was new so that the operation of said clutch operating pedal is not affected by said machining, comprising inserting a planar annular plate between said planar face and said complementary face, said annular plate having a crankshaft arbor aperture, a pair of parallel surfaces spaced apart by the thickness (T) of said planar annular plate member, said thickness (T) being substantially the amount of metal removed during the machining of said surface, the improvement comprising the method for adapting said planar annular plate to a plurality of different crankshaft arbors, comprising, providing a plurality of breakaway tabs on said crankshaft arbor aperture and breaking away said selected ones of breakaway tabs to adapt said plate to different crankshaft arbor diameters.

3. The engine transmission system defined in claim 2 wherein there are provided a plurality of said annular plates in a range of thickness, and at least a pair of said annular plates are selected to substantially provide said thickness (T).

4. The transmission system defined in claim 3 wherein there are at least two sets of said arcuate breakaway tabs, each arcuate breakaway tab of a set having the same diameter with each set having a different diameter.

5. In an internal combustion engine transmission system having an engine crank shaft, a metal flywheel connecting the engine to a drive gear box, a coupling arbor having a planar face and a complementary planar face on said flywheel, a plurality of bolts securing said flywheel to said arbor with said planar faces abutting each other, said flywheel having a transmission surface which has been resurfaced by machining to remove a layer of metal and extend the life of said flywheel, the improvement for reestablishing substantially the same position of said transmission surface in said transmission system after machining as when the transmission surface was new, comprising a planar annular plate having a pair of parallel surfaces spaced apart by the thickness (T) of said planar annular plate member, said thickness (T) being substantially the amount of metal removed during the machining of said transmission surface, said annular plate member being adapted to have one of said pair of parallel surfaces abut having a plurality of bolt holes, one for each of said bolts to pass therethrough, respectively, the improvement comprising said central aperture having a plurality of spaced arcuate breakaway tabs for adapting said shim means to different diameter arbors.

* * * * *